United States Patent

[11] 3,621,228

| [72] | Inventors | T. O. Paine<br>Administrator of the National Aeronautics and Space Administration with respect to an invention of;<br>Marvin Perlman, Granada Hills, Calif. |
|---|---|---|
| [21] | Appl. No. | 860,750 |
| [22] | Filed | Sept. 24, 1969 |
| [45] | Patented | Nov. 16, 1971 |

[54] DIGITAL FUNCTION GENERATOR
3 Claims, 2 Drawing Figs.

| [52] | U.S. Cl. | 235/197, 235/150.52, 235/150.53, 235/183, 235/194, 340/347 R |
|---|---|---|
| [51] | Int. Cl. | G06g 7/26 |
| [50] | Field of Search | 235/197, 150.53 |

[56] References Cited
UNITED STATES PATENTS

| 3,110,802 | 11/1963 | Ingham et al. | 235/150.53 |
|---|---|---|---|
| 3,345,505 | 10/1967 | Schmid | 235/197 |
| 3,435,196 | 3/1969 | Schmid | 235/197 |
| 3,483,364 | 12/1969 | Leeson | 235/197 |
| 3,486,018 | 12/1969 | Warren | 235/197 |
| 3,529,138 | 9/1970 | Andre et al. | 235/150.53 |

Primary Examiner—Malcolm A. Morrison
Assistant Examiner—Felix D. Gruber
Attorneys—J. H. Warden, Paul F. McCaul and G. T. McCoy ABSTRACT: A digital function generator capable of generating any arbitrary single valued function representable by an independent and a dependent variable is disclosed. A state signal generator produces a plurality of output state signals corresponding to quantized sequential values of the independent variable. Predetermined ones of the quantized sequential signals correspond to predetermined incremental values of the dependent variable. A decoder monitors the output of the state signal generator and provides an output signal corresponding to the time of occurrence of the predetermined quantized sequential signals and the "sense" of the dependent variable change. A monitor provides an output signal which varies as a function of the decoder output. A digital-to-analog converter converts the monitor output to an analog signal representative of the function.

DIGITAL FUNCTION GENERATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates to digital function generators and more particularly to apparatus capable of accurately and repeatably generating arbitrary functions of a variable.

2. Description of the Prior Art

There exists a requirement in certain applications to quickly, accurately and repeatably provide output signals corresponding to a preselected function of a variable. There is a further requirement to be able to readily expand or contract the function curve on a time and amplitude basis.

Known function generators may be classified in two groups; namely, those which utilize analog or digital techniques. Analog function generators suffer from a variety of severe limitations. First, analog techniques are inherently limited in the range of curves they can produce. For example, an exponential function may be approximated by simply discharging a capacitor. However, more complex functions such as hyperbolic functions require devices approaching the complexity of an analog computer. For many applications such complex devices are prohibitively costly and cumbersome. Further, analog techniques result in inherently less accurate and less repeatable waveforms than do digital techniques. This is so since analog components, as is well known, are subject to nonuniform dynamic variations. In applications where system output information is dependent upon the driving function, for example, as where the function is used to generate a sweep voltage for a mass spectrometer, such nonrepeatability results in system errors which are difficult to isolate out.

Known digital function generators also suffer from a variety of defects. Known digital function generators utilize a variety of integration and differentiation techniques to derive the required function. Such approaches typically derive a signal approximating the line slope of the function at a plurality of spaced points and thence time integrate the approximation values to obtain the desired function. Such digital approaches are complex and require a large number of components. Further, since expanding or contracting the function inherently varies both the differential approximations and the accumulated integration values, such approaches do not readily lend themselves to simple function amplitude and width modification.

OBJECTS AND SUMMARY OF THE INVENTION

In accordance with the present invention, there is provided a digital function generator capable of generating any arbitrary single valued function representable by an independent and a dependent variable.

A state signal generator produces a plurality of output state signals corresponding to quantized sequential values of the independent variable. In one embodiment, the quantized value representing signals are provided by the output of a feedback shift register cycled by a system clock which produces clock pulses at a preselectable rate. Varying the preselected clock rate provides a simple means of varying the quantized sequential independent value rate and thus the real time function width.

Predetermined ones of the quantized sequential value signals correspond to predetermined quantized sequential values of the dependent variable. A decoder monitors the output of the state signal generator and provides an output signal corresponding to the time of occurrence of the predetermined quantized sequential value signals and the "sense" of the dependent variable change. In one embodiment, the decoder is a diode-decoding matrix keyed to respond to predetermined shift register output patterns corresponding to the predetermined quantized value signals. The diode matrix is adapted to provide an output signal representative both of the time of occurrence of each predetermined quantized sequential value signal and of the "sense" of the incremental dependent variable change required, that is whether the function is increasing or decreasing in value.

A monitor is provided which generates an output signal which varies as a function of the decoder output signal. The monitor output is therefore functionally related to the dependent variable. In one embodiment, the monitor is an up-down counter which responds to the matrix output signal to either step-up or stepdown the counter reading.

An analog signal generator responsive to the monitor output generates an analog signal corresponding to the desired function value. In one embodiment, the analog signal generator is a digital-to-analog converter. The converter output will vary in accordance with the function related output of the counter.

It is therefore an object of this invention to provide a digital function generator capable of accurately and repetitively generating an arbitrary variable width and amplitude function represented by an independent and dependent variable.

It is a further object of the invention to provide a digital function generator of simpler design than those generators heretofore known.

It is still a further object of the present invention to provide a digital function generator capable of generating an arbitrary function which does not require any differentiation or integration components.

Still other objects, features and attendant advantages of the present invention will become apparent to those skilled in the art from a reading of the following detailed description of an embodiment constructed in accordance therewith taken in conjunction with the accompanying drawings and wherein:

DESCRIPTION OF THE PREFERRED EMBODIMENT

Figure 1:
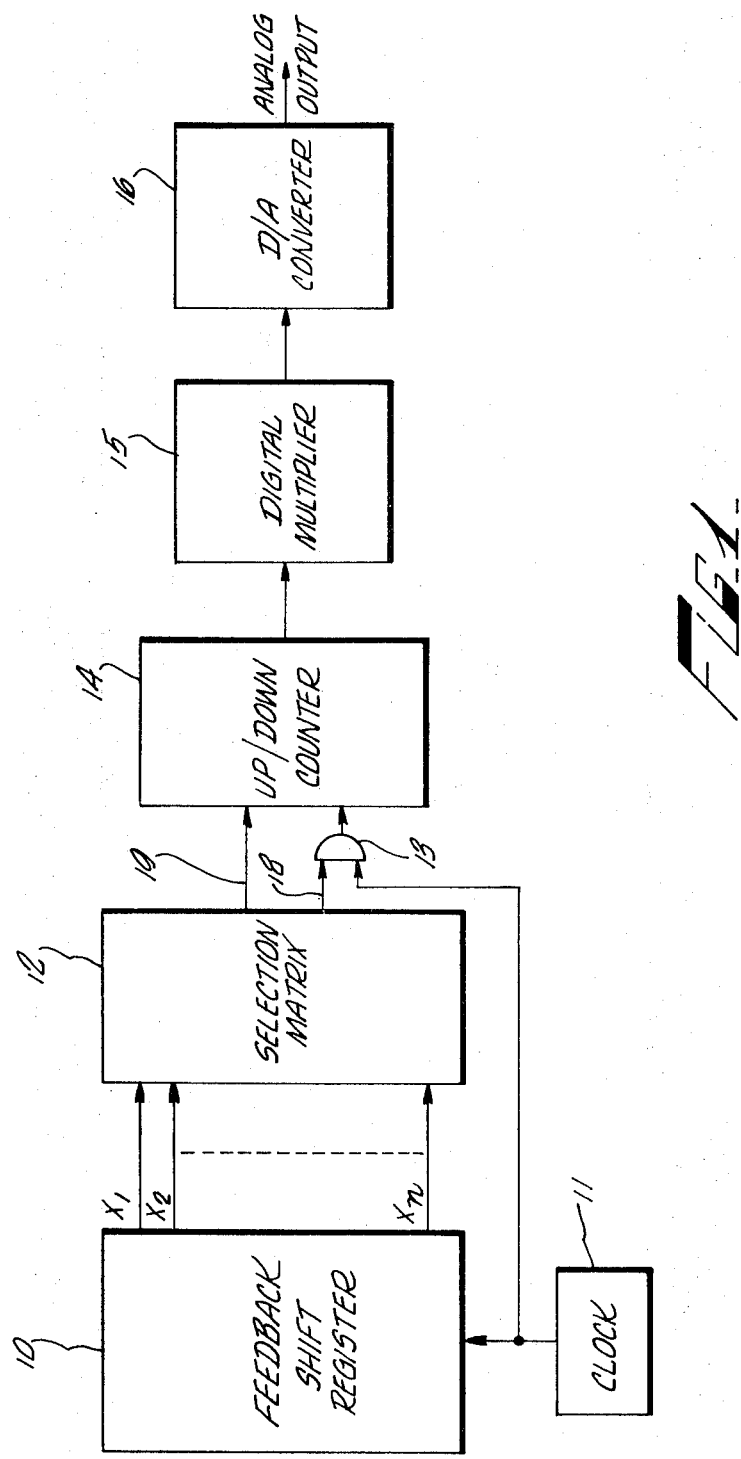
FIG. 1 is a block diagram of one embodiment of the digital function generator constructed in accordance with the principles of the present invention.

Referring now to FIG. 1, an embodiment of a function generator constructed in accordance with the present invention is shown. In the implementation of the present invention equal changes of the dependent variable, small enough in value and in sufficient number to reflect small changes in the curve representing the function, are made as a function of time in accordance with the desired shape of the curve. The approach may be appreciated having brief reference to FIG. 2 wherein the technique of approximating a hyperbolic function curve H, shown in dashed lines, is depicted. As illustrated, a hyperbolic function may be approximated by moving each of the levels along the ordinate successively maintained for a selected period of time. Increments of time may be measured, as shown, along the abscissa.

Referring to FIG. 1, a feedback shift register 10 is shown having a plurality of output stages or leads $X_1-X_n$. These output stages will individually assume either of two binary output levels and will collectively form a binary output pattern. Operation of the shift register 10 is for the purpose of cycling through all or a preselected number of these binary output patterns in synchronism with clock pulses from a system clock 11. The different binary output patterns of the feedback shift register 10 may be simply considered as multibit binary words and will hereinafter be referred to as output states. Feedback shift registers implemented according to a selected algorithm and capable of cycling through a desired number of these output states, in accordance with various feedback functions are well known and need not be described in detail here. Such state of the art knowledge is exemplified by the textbook entitled *Shift Register Sequences*, by S. W. Golombs, copyright 1967, Holden-Day, Inc. A discussion of shift register sequences of all lengths is included therein at Part III, Chapter 7, Section 5.

The minimum number of output states required to accurately approximate a particular curve and thereby adequately describe a given function is determined from an analysis of each curve desired to be reproduced. Either a graphical analysis of the function curve or an algebraic analysis if the function can be algebraically expressed, may be used for this purpose.

Figure 2:
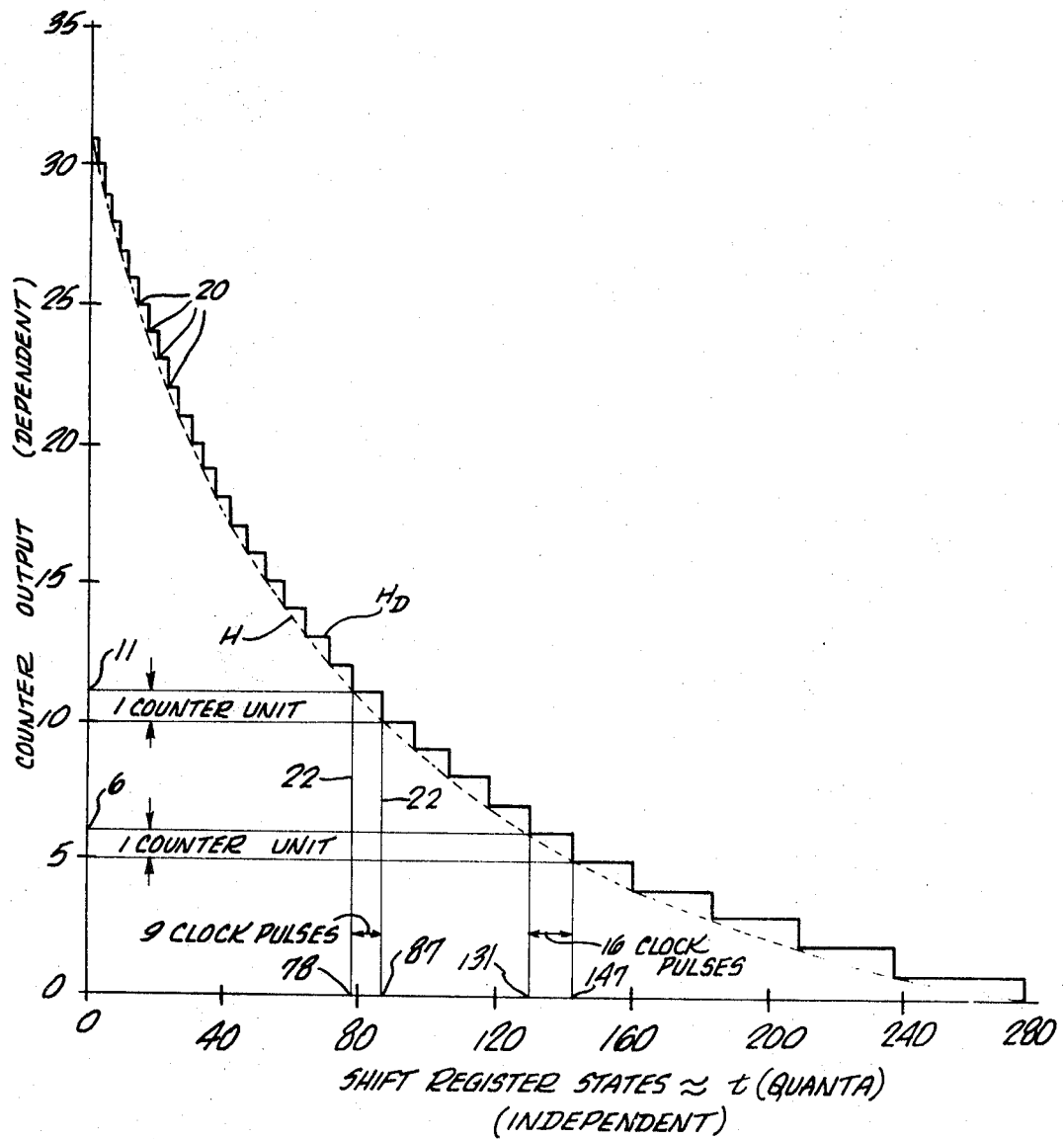
FIG. 2 is an exemplary waveform of a function capable of being generated by the apparatus of FIG. 1 and is useful in understanding the operation of the apparatus of FIG. 1.

In a graphic method, the curve such as the hyperbola H (FIG. 2) is laid out on rectangular coordinates. Parallel, equally spaced lines, exemplified by the lines 20, which are made sufficiently closely spaced to reflect small changes in the dependent variable i.e., values along the ordinate of the graph in FIG. 2, are drawn to intersect the curve H. Vertical lines 22, from the points where these parallel lines 20 intersect the curve are then drawn to the abscissa. The abscissa is then linearly scaled with a number of equal increments. As may be observed from the graph of FIG. 2, these equal increments correspond to clock pulse periods which should be made of sufficiently short duration to accommodate steep amplitude variations in the desired curve, as for example is true of the illustrated hyperbola H near the time $t \cong o$.

The number of shift register output stages, or bits in a binary output word, required to provide the minimum number of different binary output words or states may be determined from the equation:

$$S_{output} \leq 2^n \quad (1)$$

wherein "$S_{output}$" is the number of unique output states required and "n" is the number of binary output shift register states required. For example, 600 different binary words would require the use of 10 shift register stages or, otherwise considered, binary output words each including 10 bits.

In accordance with the present invention, time is correlated with the output states or binary output words of the shift register. It is to be understood that in accordance with the above discussion, each abscissa intersection point such as those found by the vertical lines 22 (FIG. 2) has associated therewith a unique shift register output state or binary output word. The abscissa intersection points may thus correspond to the times of occurrence of the selected unique output states within the entire sequence of output states of the feedback shift register.

A selection matrix 12, which functions as a decoder, receives the output of shift register 10. Selection matrix 12 is adapted to provide on an output lead 18 an enabling output to an AND-gate 13 when each preselected output state or binary output word is reached by shift register 10. Selection matrices adapted to provide outputs in accordance with a desired truth table function are well known, and need not be described in detail here. Selection matrix 12 may preferably be a diode matrix connected to provide an output which is the desired preselected Boolean function of the input provided by shift register 10.

The output of selection matrix 12 is used to step an up-down counter 14 in the following manner. Whenever the feedback shift register 10 provides selection matrix 12 with one of the predetermined discrete output states corresponding to an abscissa intersection point as above described, the selection matrix supplies an enable pulse on line 18 to AND-gate 13. And-gate 13 further receives each clock pulse, as shown. When thus enabled, AND-gate 13 passes the pulse synchronously provided by clock 11 which is thereafter "counted" by up-down counter 14. The diode matrix therefore serves to convert the nonweighted code of the feedback shift register to a series of nonuniformly spaced time pulses which are used to vary the counter reading.

The "sense" of the count, that is whether the pulse from And-gate 13 increments or decrements counter 14 is determined by a second output from selection matrix 12 which appears on line 19. The "sense" of the required dependent variable change at each intersection point is encoded into the selection matrix and is supplied as part of the Boolean transfer function of the matrix in a well-known manner.

Counter 14 is therefore continuously incremented or decremented under the control of the matrix 12 in order to produce the desired function. Counter 14 is "initialized" by initially reading in a binary number proportional to the desired initial value of the dependent variable i.e., measured along the ordinate FIG. 2. As a practical matter it is well known that this may be done by setting or resetting each of a number of bistable devices, such as flip-flops, that make up the counter. The same procedure would be applicable to initialize the shift register 10. The time history of the counter reading will therefore accurately represent the function desired to be generated.

A digital multiplier 15 continuously receives the output of counter 14. A digital-to-analog converter 16 receives the output of digital multiplier 15 and provides the analog equivalent of the binary digital multiplier output signals. Digital multiplier 15 is adapted to provide a binary output signal which is a predetermined multiple of the counter output signal. Varying the transfer ratio [output/input] of multiplier 15 allows the output waveform to be varied over any desired amplitude excursion.

Referring again to FIG. 2, the dashed curve H, as earlier discussed, represents a hyperbolic function or curve. The heavy solid lines may be taken to represent the digitally reproduced function $H_d$ as generated by the apparatus of the present invention. As above described, equal changes in the dependent variable are held for varying time durations in accordance with desired shape of the curve. To generate the curve of FIG. 2, a nine-stage feedback shift register was caused to generate output states responsive to clock pulses in accordance with the feedback function: $a_k = a_{k\cdot 1}5 \oplus a_{k\cdot 1}9 \oplus W$ (2)

where $a_{k15}$ denotes the content of the 5th stage ($x_5$) at clock pulse interval $k$;

$a_{k19}$ denotes the content of the 9th stage ($x_9$) at clock pulse interval $k$;

$a_k$ is the bit value which is fed back to stage $x_1$ at clock pulse interval $k$; and $W$ is a specific word which is used to invert the bit value ($a_k$) normally fed back to the first stage ($x_1$) which has the effect of determining the total number of output states which the feedback shift register will cycle through. $W$ will take on a value of 1 for one and only one output state.

This function states that the 5th and 9th binaries of the shift register and W are added modulo 2 (exclusive OR'ed) as follows:

| $x_1$ | $x_2$ | $x_3$ | $x_4$ | $x_5$ | $x_6$ | $x_7$ | $x_8$ | $x_9$ | State number (clock pulse) | States selected | Counter output |
|---|---|---|---|---|---|---|---|---|---|---|---|
| 1 | 1 | 0 | 1 | 0 | 1 | 0 | 1 | 1 | 0 | 1 | 31 |
| 1 | 1 | 1 | 0 | 1 | 0 | 1 | 0 | 1 | 1 | 0 | ........... |
| 0 | 1 | 1 | 1 | 0 | 1 | 0 | 1 | 0 | 2 | 1 | 30 |
| 0 | 0 | 1 | 1 | 1 | 0 | 1 | 0 | 1 | 3 | 0 | ........... |
| 0 | 0 | 0 | 1 | 1 | 1 | 0 | 1 | 0 | 4 | 1 | 29 |
| 1 | 0 | 0 | 0 | 1 | 1 | 1 | 0 | 1 | 5 | 0 | ........... |
| 0 | 1 | 0 | 0 | 0 | 1 | 1 | 1 | 0 | 6 | 1 | 28 |
| 0 | 0 | 1 | 0 | 0 | 0 | 1 | 1 | 1 | 7 | 0 | ........... |
| 1 | 0 | 0 | 1 | 0 | 0 | 0 | 1 | 1 | 8 | 0 | ........... |
| 1 | 1 | 0 | 0 | 1 | 0 | 0 | 0 | 1 | 9 | 1 | 27 |

Shown in table I are the first 10 output states of the feedback shift register 10 that would be generated according to the feedback function of equation (2). The first state, namely 110101011, was used to initialize the register. The 275th state or binary output word namely 101010111, was used to represent W, which as is indicated in table II, is the last selected binary output word and may be used to cause the register 10 to cycle back to the initial state in any conventional fashion. The states or binary output words selected in accordance with the above discussion to decrement the counter are indicated by a "1" in the "States selected" column of table 1. A count of 31 was used to initialize the counter. Each selected state or binary output word thereafter decremented the counter reading, as shown.

The binary output words that were not selected i.e., 111010101, as is indicated by a "0" in the "States Selected" column, simply occur without any further response. It may be noted from table I, however that each binary output word will occur at a particular position or time in the entire sequence of binary output words defined by a feedback function or algorithm such as equation (2). Consequently, since each binary word is clock pulse related and thus time related, as is shown by FIG. 2 and as was earlier discussed, the unselected binary output words or states may be viewed as incidentally serving to properly time space the selected states or binary output words. From table I and table II, it may be further observed that the individual states or binary output words have no individual significance other than being selected for its order of occurrence within the entire sequence of states or binary output words defined by the algorithm.

It is thus to be noted that successive register output states or binary output words appear for fixed durations of time and at regular intervals as determined by the clock rate of the clock 11 whereas the selected states or binary output words are separated by time intervals in accordance with the desired curve.

The hyperbolic curve of FIG. 2 was represented by 32 selected binary output words formed by variable duration levels, as shown. The 32 nine-bit combinations and the corresponding state numbers, indicating order of occurrence appear in table II. The decoding matrix 12 furnished an enabling pulse to the binary counter 14 via the AND-gate 13 for each of these 32 selected shift register output states.

| $x_1$ | $x_2$ | $x_3$ | $x_4$ | $x_5$ | $x_6$ | $x_7$ | $x_8$ | $x_9$ | $\tilde{t}(k)$ in quanta $\left[\begin{array}{c}\text{clock}\\\text{pluse}\\\text{interval}\end{array}\right]$ | Up/down command | Counter output |
|---|---|---|---|---|---|---|---|---|---|---|---|
| 1 | 1 | 0 | 1 | 0 | 1 | 0 | 1 | 1 | 0 | 0 | 31 |
| 0 | 1 | 1 | 1 | 0 | 1 | 0 | 1 | 0 | 2 | 0 | 30 |
| 0 | 0 | 0 | 1 | 1 | 1 | 0 | 1 | 0 | 4 | 0 | 29 |
| 0 | 1 | 0 | 0 | 0 | 1 | 1 | 1 | 0 | 6 | 0 | 28 |
| 1 | 0 | 1 | 0 | 0 | 1 | 1 | 0 | 1 | 8 | 0 | 27 |
| 0 | 0 | 1 | 1 | 0 | 0 | 1 | 0 | 0 | 11 | 0 | 26 |
| 0 | 1 | 0 | 0 | 0 | 1 | 1 | 0 | 0 | 14 | 0 | 25 |
| 1 | 0 | 0 | 0 | 1 | 0 | 0 | 0 | 1 | 17 | 0 | 24 |
| 0 | 0 | 0 | 1 | 0 | 0 | 0 | 1 | 0 | 20 | 0 | 23 |
| 0 | 0 | 0 | 0 | 0 | 1 | 0 | 0 | 0 | 23 | 0 | 22 |
| 1 | 0 | 0 | 0 | 0 | 0 | 0 | 0 | 1 | 26 | 0 | 21 |
| 0 | 0 | 0 | 1 | 0 | 0 | 0 | 0 | 0 | 30 | 0 | 20 |
| 0 | 0 | 1 | 0 | 0 | 0 | 0 | 0 | 1 | 34 | 0 | 19 |
| 0 | 0 | 1 | 0 | 0 | 0 | 1 | 1 | 0 | 38 | 0 | 18 |
| 0 | 1 | 0 | 0 | 0 | 1 | 1 | 0 | 0 | 42 | 0 | 17 |
| 0 | 1 | 1 | 1 | 0 | 0 | 1 | 0 | 0 | 47 | 0 | 16 |
| 0 | 1 | 0 | 1 | 0 | 0 | 1 | 1 | 1 | 52 | 0 | 15 |
| 0 | 0 | 1 | 1 | 0 | 1 | 0 | 1 | 0 | 58 | 0 | 14 |
| 1 | 0 | 1 | 1 | 0 | 0 | 0 | 0 | 1 | 64 | 0 | 13 |
| 0 | 0 | 1 | 0 | 1 | 1 | 1 | 1 | 0 | 71 | 0 | 12 |
| 0 | 1 | 1 | 1 | 0 | 1 | 1 | 0 | 0 | 78 | 0 | 11 |
| 0 | 1 | 0 | 1 | 0 | 0 | 0 | 1 | 0 | 87 | 0 | 10 |
| 1 | 1 | 0 | 1 | 0 | 1 | 0 | 0 | 1 | 96 | 0 | 9 |
| 1 | 1 | 1 | 1 | 1 | 0 | 0 | 0 | 1 | 106 | 0 | 8 |
| 1 | 0 | 0 | 1 | 0 | 0 | 1 | 0 | 0 | 118 | 0 | 7 |
| 1 | 0 | 0 | 1 | 1 | 1 | 1 | 1 | 1 | 131 | 0 | 6 |
| 1 | 1 | 0 | 0 | 1 | 1 | 0 | 0 | 1 | 147 | 0 | 5 |
| 1 | 0 | 0 | 1 | 1 | 0 | 0 | 0 | 1 | 164 | 0 | 4 |
| 0 | 1 | 1 | 1 | 1 | 1 | 1 | 1 | 0 | 185 | 0 | 3 |
| 1 | 0 | 1 | 0 | 0 | 1 | 1 | 0 | 1 | 209 | 0 | 2 |
| 1 | 0 | 1 | 1 | 0 | 0 | 0 | 0 | 0 | 238 | 0 | 1 |
| 1 | 0 | 1 | 0 | 1 | 0 | 1 | 1 | 1 | 275 | 0 | 0 |

Table II also shows the resultant counter reading for each selected state and the up-down sense command provided on line 19 of selection matrix 12 (FIG. 1).

It will be appreciated that the counter 14 was continually decremented (indicated by an arbitrarily chosen "0" in the "Up/Down Command" column) since the hyperbolic function of FIG. 2 is a monotonically decreasing function.

A nine-stage shift register is capable of providing a total of 512 discrete output states. To generate the function illustrated by FIG. 2, only 276 out of the possible 512 states were utilized. The remaining states were treated as "don't cares" and would have completed the sequence of different binary words defined by the feedback function of equation (2).

It may be readily appreciated by referring to FIG. 2 that the function width may be varied by simply varying the clock rate since the clock rate determines the real time occurrence of each output state. The analog output for any counter excursion may be varied by use of a proper multiplier transfer ratio.

I claim:

1. A function generator for providing a function signal representing a chosen function, the amplitude of said function signal representing values of said function at successively selected times, said function generator comprising:

a feedback shift register having a multiplicity of stages and adapted to be advanced through an expected sequence of different binary states, said shift register providing binary signals representing said different binary states at said stages;

matrix means, connected to receive said binary signals, for providing first and second matrix signals in response to preselected ones of said binary signals, said first matrix signal signifying the occurrence of a preselected binary signal, said second matrix signal providing a sense instruction;

a digital counter connected to receive said first and second matrix signals for providing a counter signal; said counter signal being changed in response to said first matrix signal, the direction of said change being controlled in accordance with said second matrix signal, whereby said counter signal is digitally proportional to said function signal;

and clock means, operatively connected to said feedback shift register and to said digital counter, for providing clock signals serving to advance said feedback shift register through said sequence of different binary states and serving to permit changes of said counter signal in synchronism with an advance by said feedback shift register.

2. The apparatus defined by claim 1 further including converter means for converting the digital form of said counter signal to a function signal of analog form.

3. The apparatus defined by claim 2 wherein the converter means includes a digital multiplier for altering the scale of said counter signals to be proportionally greater or lessor, the scale of said function signals being correspondingly altered.

* * * * *